United States Patent Office 3,486,518
Patented Dec. 30, 1969

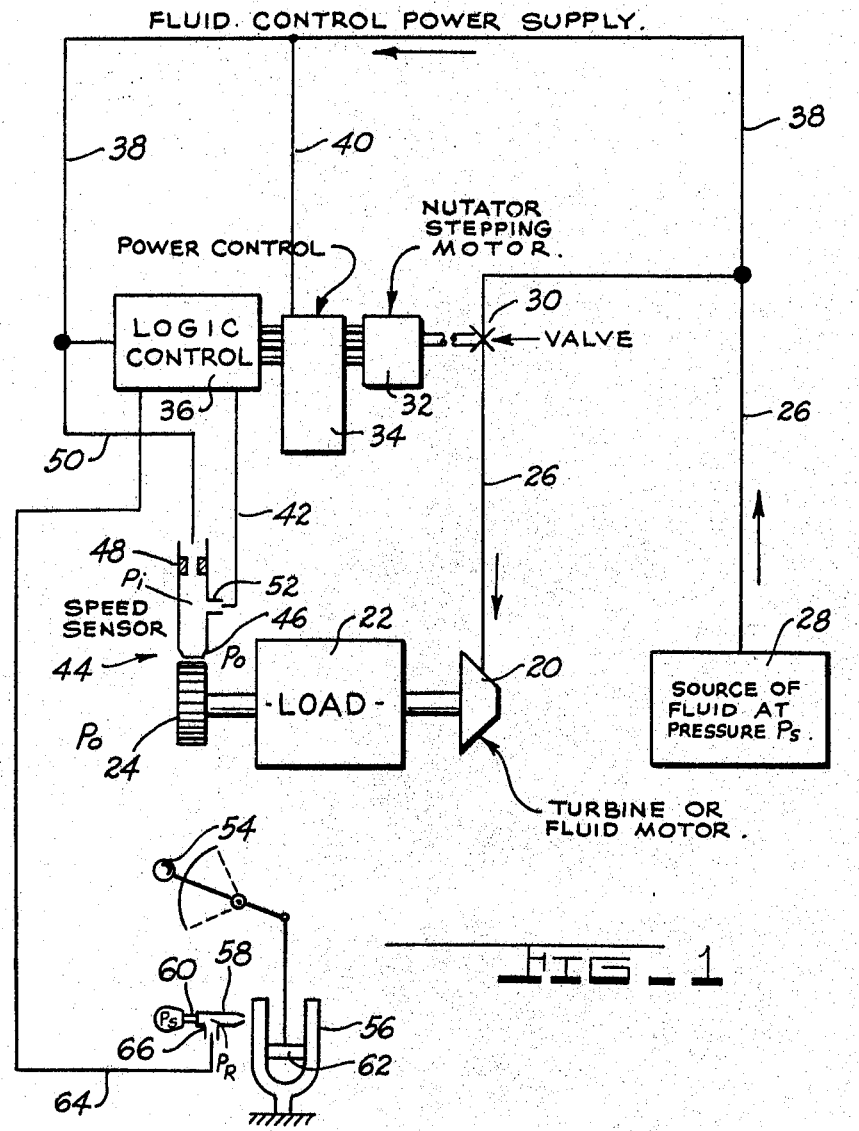
FIG_1

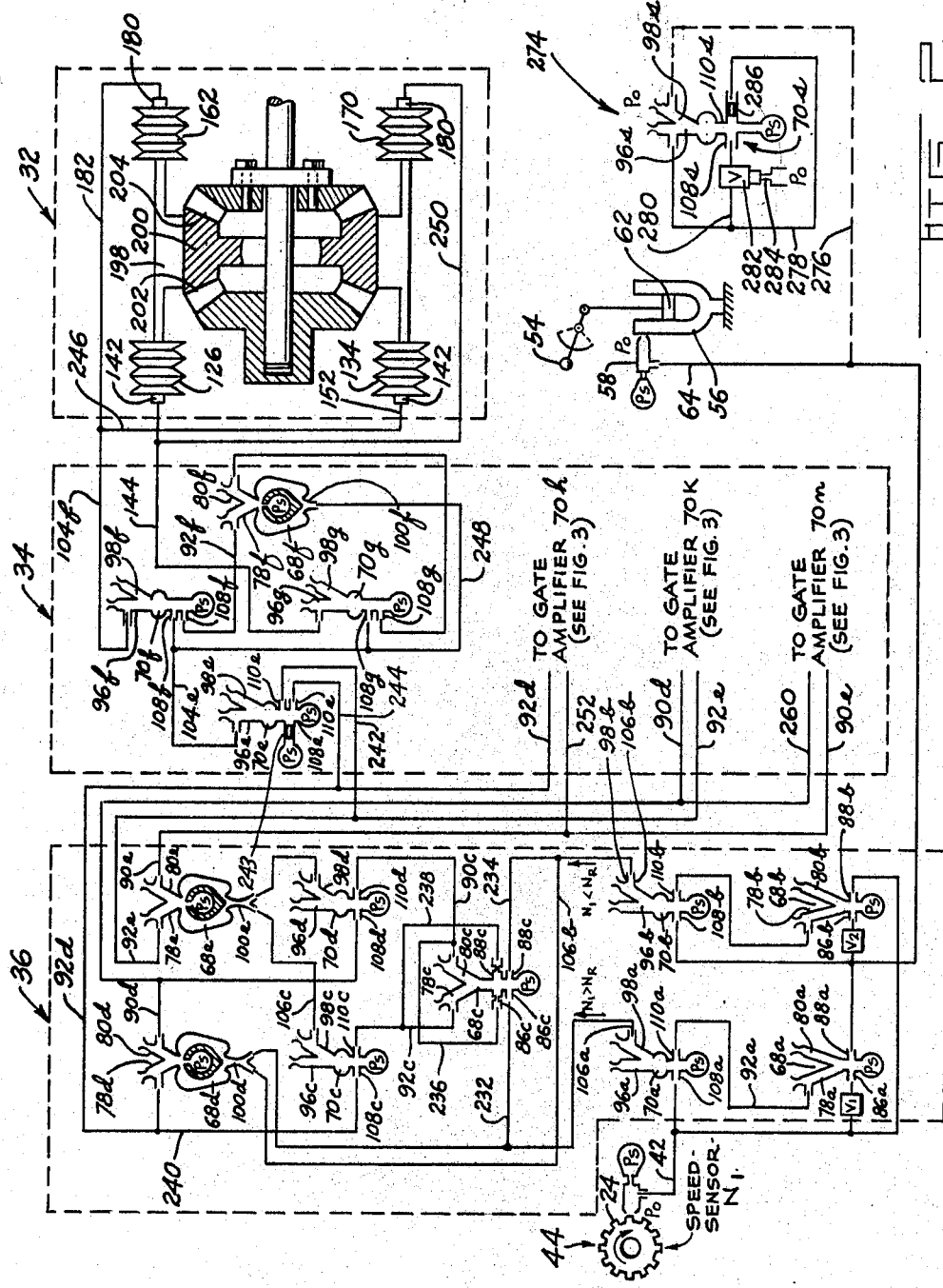

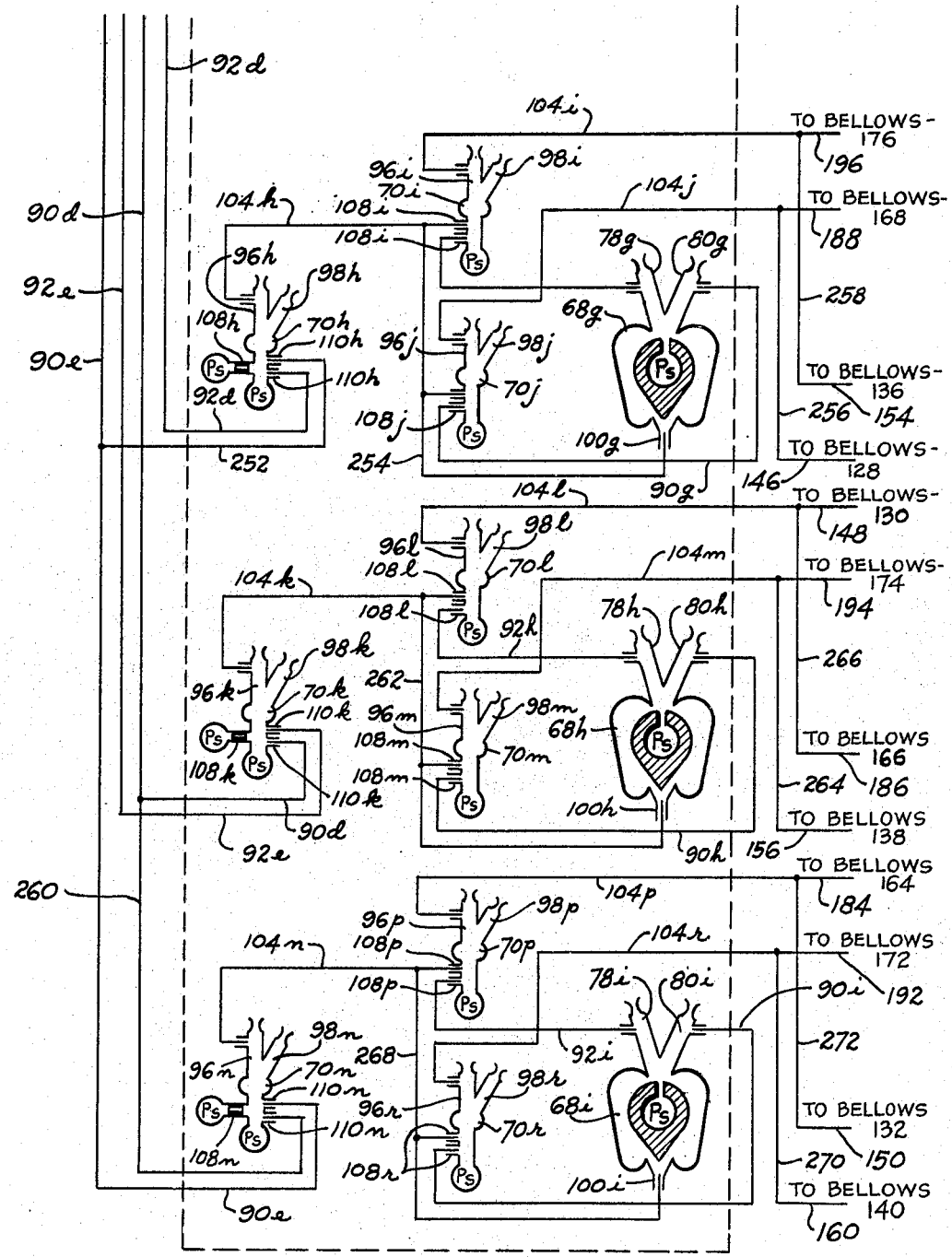

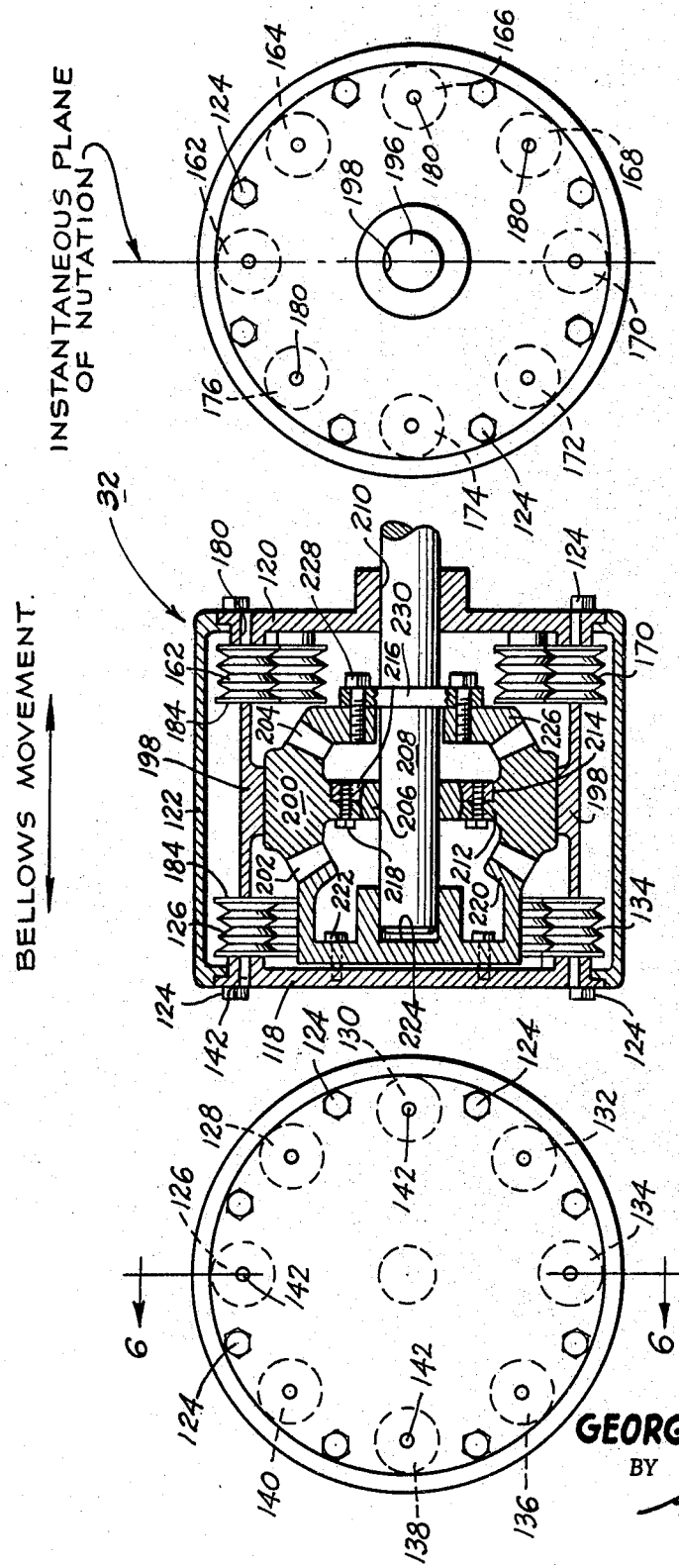

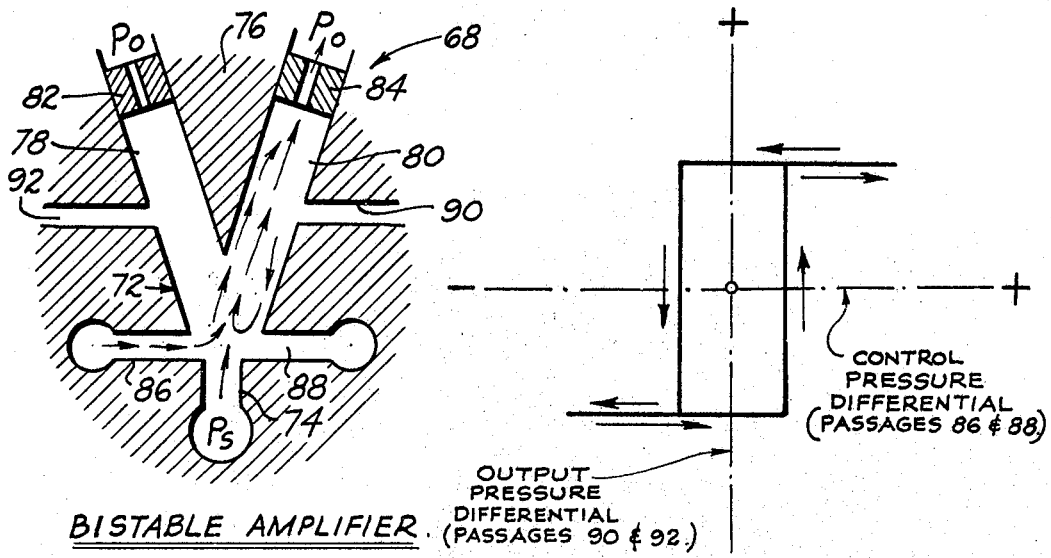
BISTABLE AMPLIFIER
FIG_7
FIG_8
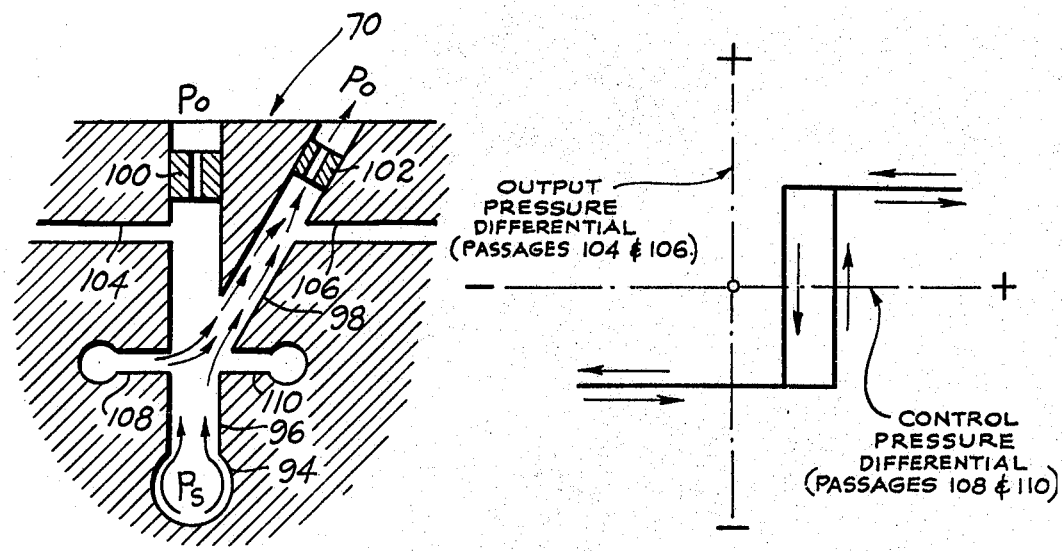
GATE AMPLIFIER
FIG_9
FIG_10
INVENTOR.
GEORGE R. HOWLAND.
BY
AGENT.

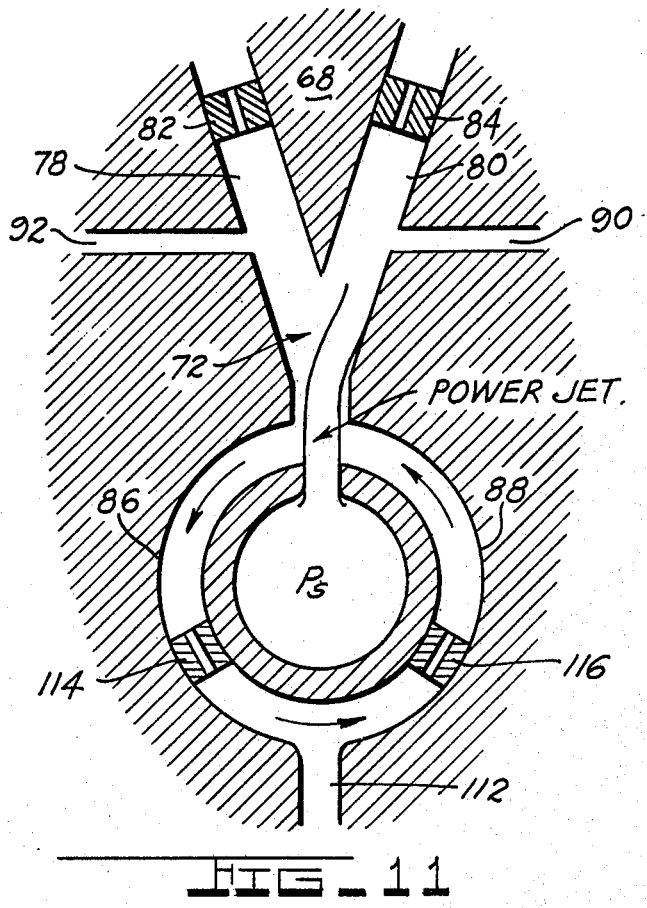
FIG_11
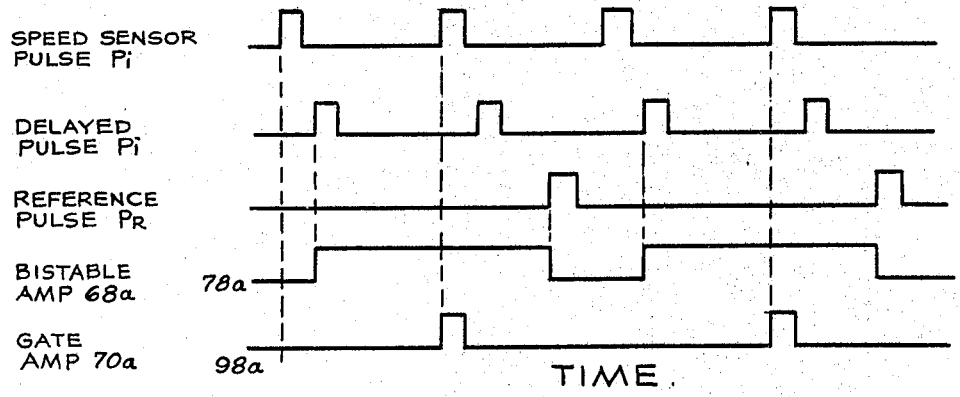
FIG_12
INVENTOR.
GEORGE R. HOWLAND.
BY
*AGENT.*

3,486,518
CONTROL APPARATUS UTILIZING PURE FLUID LOGIC CONTROL AND NUTATING STEPPING MOTOR
George R. Howland, South Bend, Ind., assignor to The Bendix Corporation, South Bend, Ind., a corporation of Delaware
Filed June 15, 1964, Ser. No. 375,207
Int. Cl. F15c 1/14
U.S. Cl. 137—81.5                 10 Claims

ABSTRACT OF THE DISCLOSURE

Control apparatus including a fluid pressure operated nutating stepping motor actuated by a first series of bellows and a second series of opposing bellows which are sequentially pressurized by fluid pressure signals generated by a pure fluid amplifier logic network in response to a variable input signal applied thereto.

---

Control systems for use with modern high performance aircraft and nuclear operations are unique in that factors such as reliability, maintenance, weight, size, ability to tolerate high temperature extremes and/or radiation levels must be given utmost consideration. In general, present day control systems of the above mentioned type indicate a need for eliminating to the greatest degree control system components such as moving parts which rely upon dimensional tolerances as well as servo power networks for correct operation, fluid seals for isolating two or more different fluids at the same or different pressure levels, electromechanical torque motors or the like for providing power output motion and associated mechanism all of which dictates the size and weight of the complete system.

It is therefore an object of the present invention to provide a control system which has relatively few moving parts thereby reducing space allocation, maintenance and servo power requirements to a corresponding minimum.

It is another object of the present invention to provide a pure fluid control system including a fluid pressure operated nutating stepping motor which is resistant to high temperature and gamma radiation effects without the need for cooling mechanism and/or radiation protection.

It is an important object of the present invention to provide a control system of the pure fluid type wherein sealing members are not required for operation in corrosive or volatile fluids.

Additional objects and advantages of the present invention will be apparent from the following description taken with the accompanying drawings wherein:

FIGURE 1 is a schematic representation in block form of the various component sections of the present invention suitably labeled and connected to control the operation of a turbine or fluid operated motor;

FIGURE 2 is a schematic representation of the circuitry of the logic control, power control and nutator stepping motor of FIGURE 1;

FIGURE 3 is a view showing the remaining three portions of the power control of FIGURE 2;

FIGURE 4 is a view of one end of the nutator stepping motor shown in block form in FIGURE 1;

FIGURE 5 is a view of the opposite end of the nutator stepping motor of FIGURE 4;

FIGURE 6 is a sectional view taken on line 6—6 of FIGURE 4;

FIGURE 7 is a schematic view of a bistable amplifier shown in cross section;

FIGURE 8 is a graph showing the output pressure vs. control pressure characteristics of the bistable amplifier of FIGURE 7;

FIGURE 9 is a schematic view of a gate amplifier shown in cross section;

FIGURE 10 is a graph showing the output pressure vs. control pressure characteristic of the gate amplifier of FIGURE 9;

FIGURE 11 is a schematic view in cross section of a modified form of the bistable amplifier of FIGURE 7; and FIGURE 12 is a graph showing a time sequence for reference and speed pressure pulses $P_R$ and $P_1$, respectively, and the effect of the pulses on operation of the gate and bistable amplifiers receiving the same.

Referring to FIGURE 1, a turbine or fluid motor 20 is loaded by a rotatable energy absorbing device 22, the speed of which is represented by the rotation of a gear like member 24 suitably connected to and driven by the device 22. The turbine or fluid motor 20 is provided pressurized fluid by a conduit 26 leading from a source of fluid 28 at pressure $P_s$. The flow of pressurized fluid to the turbine or fluid motor 20 is controlled by a valve 30 suitably arranged in conduit 26. It will be understood that the source of pressurized fluid 28 may be a liquid or a gas which is maintained at a relatively constant pressure $P_s$ by suitable pressurizing apparatus, not shown.

The valve 30 is actuated by a nutator stepping motor 32 which receives input fluid pressure signals from a power control unit 34 which responds to fluid pressure signals supplied thereto from a logic control unit 36. A conduit 38 communicates fluid at pressure $P_s$ from conduit 26 to the logic control unit 36 and a branch conduit 40 communicates fluid at pressure $P_s$ to the power control unit 34. The logic control unit 36 receives an input fluid pressure signal which fluctuates as a function of the speed of rotation of device 22 via a conduit 42 which communicates with a speed sensing unit 44 which converts the rate of mechanical rotation of gear 24 to a fluid pressure signal $P_1$.

The speed sensing unit 44 includes a nozzle portion 46 in series with and downstream from a fixed area restriction 48, the restriction 48 being supplied fluid at pressure $P_s$ via a conduit 50 leading from conduit 38. The nozzle portion 46 and gear 24 are arranged in spaced apart relationship such that, in turn, each successive tooth of gear 24 passes the nozzle portion 46 as gear 24 rotates thereby controlling the effective flow area of nozzle portion 46 which discharges to a region of relatively low drain pressure $P_o$. As a result, the fluid pressure $P_1$ intermediate the nozzle portion 46 and restriction 48 pulsates with a frequency that is proportional to the rotational speed of the gear 24. The fluctuating intermediate pressure $P_1$ is vented to conduit 42 via a tap or port 52. The frequency characteristics of the pulsating intermediate pressure $P_1$ is defined by the relationship $F = N \times \omega$, where $N$ represents the number of gear teeth and $\omega$ represents the speed of gear 24 in revolutions per second.

The logic control unit 36 also receives an input fluid pressure signal or reference pressure $P_R$ which fluctuates as a function of the position of a speed selection lever 54. The reference pressure signal $P_R$ fluctuates as a function of the frequency of oscillation of a tuning fork 56 which has one tine oscillating adjacent a nozzle 58 which is supplied fluid at pressure $P_s$ from a conduit, not shown, connected to source 28 through a fixed area restriction 60. The tuning fork 56 controls the effective flow area of nozzle 58 which discharges to drain $P_o$ such that the fluid pressure intermediate nozzle 58 and restriction 60 fluctuates with a frequency corresponding to the frequency of oscillation of tuning fork 56. The reference pressure $P_R$ frequency may be varied as a function of the position of the speed selection lever, for example, by providing a movable slug 62 tightly clamped between the tines of tuning fork 56 and connected to speed selection lever 54 through suitable linkage which positions the slug 62 longitudinally along tuning fork 56 thereby causing an increase or decrease in the frequency of oscillation of tuning fork 56 depending upon the direction of movement of lever 54. The pressure $P_R$ intermediate nozzle 58 and restriction 60 is vented to the logic control unit 36 via a conduit 64 and a tap or port 66. The tuning fork is energized by the pressurized flow of fluid impinging thereagainst.

Referring to FIGURE 2, the internal component structure of the logic control unit 36, power control unit 34 and nutator stepping motor 32 is shown in schematic form which component structure includes two basic types of fluid amplifiers 68 and 70, bistable and gate, respectively, which are interconnected by fluid pressure transmitting passages as shown and which ultimately provide the fluid pressure signals to operate the stepping motor 32 as will be described hereinafter. The structural and operational characteristics of the individual bistable and gate amplifiers 68 and 70 are believed to be sufficiently well known to those persons skilled in the art that detailed structural characteristics of the same need not be shown or described for a thorough understanding of applicant's control network. No claims to the individual bistable and gate amplifiers 68 and 70 per se are made by applicant.

Referring to FIGURES 7, 8, 9 and 10 which illustrate the bistable and gate amplifiers 68 and 70 in schematic form, there is also shown in graphic form the flow vs. time characteristics of the respective amplifiers. The basic control action for the bistable and gate amplifiers is in utilization of a relatively low energy fluid flow to control a stream of higher energy fluid flow.

Referring to FIGURE 7 which illustrates the bistable amplifier 68, numeral 72 designates a diverging chamber which receives a power jet comprising a pressurized stream of fluid from a supply passage 74 connected to the source of fluid at pressure $P_s$ by a conduit, not shown. A flow splitter 76 divides the chamber 72 thereby defining two output passages 78 and 80 provided with restrictions 82 and 84, respectively, through which chamber 72 is vented to a drain source of fluid pressure $P_0$ which may be the atmosphere or any suitable relatively low pressure source.

The bistable amplifier operates on the known principle that the stream of pressurized fluid or power jet issuing from passage 74 will cling to the diverging walls of chamber 72 due to the fluid counterflow generated between a wall of the chamber and the adjacent stream of fluid which counterflow produces a low pressure area which holds the stream of fluid adjacent the wall. If the low pressure area is destroyed by a control fluid pressure, the power jet will switch to the opposite wall where a similar low pressure area will be generated which holds the power jet against the opposite wall until a control fluid pressure is applied to destroy the latter low pressure area. This phenomenon is known as the "Coanda" effect. Suitable control fluid pressures are applied to deflect the power jet in the above mentioned manner by two oppositely disposed control fluid passages 86 and 88 ported to the upstream portion of chamber 72 and arranged to inject control pressurized fluid substantially at a right angle to the power jet issuing from passage 74. As shown in FIGURE 7, control pressurized fluid discharged from passage 86 diverts the power jet to the right thereby pressurizing outlet passage 80 which is provided with a pressure tap 90 upstream from restriction 84. Likewise, control pressurized fluid discharged from passage 88 diverts the power jet to the left thereby pressurizing outlet passage 78 which is provided with a pressure tap 92 upstream from restriction 82.

FIGURE 8 is a graphic illustration of the fluid pressure relationship occurring at control fluid passages 86 and 88 and the corresponding output fluid pressure relationship generated at output passages 90 and 92. The pressure of the fluid discharged from control fluid passage 86 or 88 must exceed the pressure existing at the opposing control fluid passage 86 or 88 as the case may be to effect deflection of the power jet. It will be noted that the differential between the control fluid pressures will be in either a positive or negative sense depending upon which of the control fluid passage 86 and 88 is pressurized as indicated by the arrows in FIGURE 8.

Referring to FIGURE 9 which illustrates the gate amplifier 70, numeral 94 designates an inlet port connected to the source of fluid at pressure $P_s$ and adapted to discharge a power jet comprising a stream of pressurized fluid which enters a passage 96 having a branch passage 98 disposed at an angle thereto. The passages 96 and 98 are provided with restrictions 100 and 102, respectively, through which the power jet is vented to the relatively low pressure drain source $P_0$. Pressure taps including passages 104 and 106 communicate with passages 96 and 98, respectively, upstream from their respective restrictions 100 and 102. The power jet flow normally by-passes branch passage 98 and flows through passage 96 thereby pressurizing tap 104 only. However, the power jet flow may be deflected to branch passage 98 by a control stream of pressurized fluid which is discharged from a control fluid passage 108 ported to passage 96 and which intercepts the power jet substantially at a right angle thereto. A second control fluid passage 110 oppositely disposed to passage 102 and ported to passage 96 provides a second control stream of pressurized fluid which also intercepts the power jet and, in conjunction with the flow from passage 108, controls deflection of the power jet. It will be understood that the pressure tap 104 is pressurized by the power jet which flows through passage 96 only as long as no control stream of pressurized fluid is applied by control fluid passage 108 or as long as the pressure of a control stream of fluid applied by control fluid passage 108 is less than the pressure of a control stream of fluid applied by control fluid passage 110. If the pressure of the control stream of fluid from passage 108 directed against the power jet is greater than the pressure of the control stream of fluid from passage 110 directed against the power jet, the power jet is deflected into branch passage 98 to thereby pressurize tap 106. The absence of a control stream of fluid from both control passages 108 and 110 results in a power jet by passing branch passage and being directed through passage 96 only in which case tap 104 is pressurized.

FIGURE 10 is a graphic illustration of the fluid pressure relationship occurring at control fluid passages 108 and 110 and the corresponding output fluid pressure relationship generated at output passages 96 and 98. As shown by the arrows of FIGURE 10, if the pressure of the fluid discharged from control fluid passage 108 exceeds the fluid pressure at the opposing control fluid passage 110 in the positive direction, the power jet will be deflected to passage 98. When the pressure of the fluid at control fluid passage 108 decreases, the power jet will deflect back to passage 96 when the same differential, or less, if hysteresis effects are to be considered, is reached.

Referring to FIGURE 11 which illustrates a modified form of the bistable amplifier 68 of FIGURE 7 with like structural components denoted by similar numerals, it will be noted that control fluid passages 86 and 88 are connected to a common inlet passage 112 which communicates with a source of control fluid pressure as will be described.

As shown by the arrows in FIGURE 11, the low pressure area generated between the chamber wall and adjacent power jet flow as a result of the aforementioned Coanda effect produces a circulation of fluid through the control fluid passages 86 and 88 which circulation of fluid is reversed from that shown when the power jet is deflected to passage 78. The circulation of fluid through passages 86 and 88 is suitably controlled by restrictions 114 and 116 disposed in control fluid passages 86 and 88, respectively, to prevent destroying the low pressure area which holds the power jet adjacent the wall of chamber 72. When a control fluid pressure pulse is supplied to inlet 112 the pressure pulse reinforces the fluid flow circulating through passages 86 and 88 causing an increase in pressure in the low pressure region adjacent the power jet which, in turn, results in the power jet switching to the opposite wall of chamber 72. A second pressure pulse supplied to inlet 112 will deflect the power jet back to the position shown in FIGURE 11. As in the case of the bistable amplifier of FIGURE 7, the power jet will remain against either wall of chamber 72 as long as no pressure signal is applied to inlet 112.

Referring to FIGURES 4, 5 and 6, the nutating stepping motor 32 includes a casing defined by spaced apart end plates 118 and 120 and cylindrical wall portion 122, the latter being removably secured to end plates 118 and 120 by suitable fastening means such as bolts 124. A first series of spaced apart circumferentially arranged bellows 126, 128, 130, 132, 134, 136, 138 and 140 anchored at one end to plate 118 are vented interiorly by associated ports 142 formed in plate 118 to control fluid passages 144, 146, 148, 150, 152, 154, 156 and 160, respectively, leading to the power control unit 34 which controls the fluid pressure applied to the bellows as will be described. A second series of spaced apart circumferentially arranged bellows 162, 164, 166, 168, 170, 172, 174 and 176 oppositely disposed to the first series of bellows are anchored at one end to end plate 120 and vented interiorly via associated ports 180 formed in plate 120 to control fluid passages 182, 184, 186, 188, 190, 192, 194 and 196 leading to the power control unit 34. A connecting link 198 interposed between each pair of oppositely disposed bellows, as for example, bellows 126 and 162, is fixedly secured by any suitable means such as brazing to the closed movable end portions of its respective bellows and movable therewith in response to expansion or contraction of the bellows caused by pressurization thereof as will be described.

A nutating bevel gear member 200 provided with first and second series of gear teeth 202 and 204, respectively, is fixedly secured at its radially outermost portion by any suitable means, not shown, to a complementary mating surface on the connecting links 198. Gear member 200 is adapted to nutate on the curved bearing surface of a bearing member 206 secured to and supported by a shaft 208, one end of which shaft extends through an opening 210 in end plate 120. A web 212 forming the radially innermost portion of gear member 200 is provided with a notch 214 extending along half the thickness of the web which notch receives an annular retaining ring 216 fixedly secured to the web 212 by bolts 218. The web 212 and retaining ring 216 are provided with complementary curved bearing surfaces which mate with the bearing surface of member 206 thereby providing support for gear member 200. A bevel gear member 220 fixedly secured to end plate 118 by suitable fastening means such as bolts 222 is adapted to support one end of shaft 208 by means of a circular cavity 224 formed therein which receives one end of shaft 208. Gear member 220 has the same number of teeth as well as teeth characteristics as series 202 with which it meshes. A beveled gear member 226 fixedly secured by bolts 228 to a flange 230 integral with shaft 208 is adapted to mesh with series 204. The gear member 226 differs by one in the number of teeth therein compared to the nutating gear member 200 such that one nutation cycle (rolling of gear member 200 around fixed gear member 220) of gear member 200 results in rotational movement of gear member 226 as well as shaft 208 secured to gear member 226 through an angle defined by the width of one gear tooth of gear member 226 as will be readily understood by those persons familiar with the art. It will be understood that, due to the fixed position of gear member 220, the nutating gear member 200 which meshes with gear 220 will not rotate with respect to gear member 220 and rotational movement will be confined to gear member 226 which rotational movement will occur in increments depending upon the speed at which gear member 200 nutates thereby producing a stepping action of shaft 208.

In the following description of operation and with reference to FIGURE 2 which illustrates the overall control network, it will be understood that the bistable amplifiers and gate amplifiers shown therein correspond to the various bistable amplifiers and gate amplifier shown and described in FIGURES 7, 9 and 11 with like structure designated by like numerals and further identified by letter subscripts to identify the individual amplifiers.

Operation of the system will now be described assuming that the lever 54 occupies a position requesting a speed lower than the existing speed of device 22 as indicated by the relative frequencies of speed sensor and reference pressure pulses $P_i$ and $P_R$ shown in FIGURE 12. The speed sensor pressure pulses $P_i$ are transmitted via passage 42 to control fluid passages 108a of gate amplifier 70a, 86a of bistable amplifier 68a and 88b of bistable amplifier 68b and the reference pressure pulses $P_R$ are transmitted via passage 64 to control fluid passages 108b of gate amplifier 70b, 88a of bistable amplifier 68a and 86b of bistable amplifier 68b. It will be noted the gate amplifier 70a and bistable amplifier 68a are connected in parallel arrangement with gate amplifier 70b and bistable amplifier 68b with the gate amplifier 70a providing an output pressure pulse train indicative of $N > N_R$ and gate amplifier 70b providing an output pressure pulse train indicative of $N < N_R$ wherein N designates speed of rotation of gear 24 and $N_R$ represents a reference speed established by tuning fork 56.

It will be assumed that initially the bistable amplifier 68a is operating with its power jet directed into outlet passage 78a which, in turn, is vented to control fluid passage 110a of gate amplifier 70a via passage 92a. Accordingly, the power jet of gate amplifier 70a is directed into outlet passage 96a and vented to drain pressure $P_o$. For the purpose of explanation, the gate amplifier 70a, as well as the remaining gate amplifiers, will be termed "closed" when the power jet associated therewith is vented in the abovementioned manner of gate amplifier 70a and "open" when the power jet is vented to outlet passage 98a.

Referring to FIGURES 2 and 12, a speed sensor pressure pulse $P_i$ arriving at control fluid passage 108a of gate amplifier 70a will be vented along with the power jet out passage 96a by virtue of the opposing overriding flow out of control fluid passage 110a. The speed sensor pressure pulse $P_i$ passes through control fluid passage 86a of bistable amplifier 68a which passage is provided with a conventional delay volume $V_1$ that imposes a delay of predetermined duration on the pulse $P_i$ as indicated in FIGURE 12. The delayed pressure pulse $P_i$ acts against the power jet of bistable amplifier 68a deflecting the same to outlet passage 80a which vents the power jet to drain pressure $P_o$ thereby removing the pressure signal at outlet passage 78a which, in turn, permits the power jet of gate amplifier 70a to be deflected to outlet passage 98a under the influence of a subsequent pressure pulse $P_i$ occurring at control fluid passage 108a thereby "opening" gate amplifier 70a. As indicated in FIGURE 12, the second pressure pulse $P_i$ at passage 108a encounters the "open" gate amplifier 70a and passes with the power jet thereof to outlet passage 98a. The delayed second pressure pulse $P_i$ occurring at bistable amplifier 68a does not change the direction of the power jet thereof which is already deflected into outlet passage 80a.

If a reference pressure pulse $P_R$ occurs between second and third speed sensor pressure pulses $P_i$, the pulses $P_R$ occurring at bistable amplifier 68a will deflect the power jet thereof from outlet passage 80a to outlet passage 78a which results in a pressure signal transmitted to gate amplifier 70a. The power jet of "closed" amplifier 70a being directed to passage 96a is not affected by the pressure signal which occurs at control fluid passage 110a. The third speed sensor pressure pulse $P_i$ occurring at "closed" gate amplifier 70a is overriden by the opposing pressure signal from control passage 110a such that the power jet of amplifier 70a remains directed into outlet passage 96a. The delayed third pressure pulse $P_i$ occurring at bistable amplifier 68a deflects the power jet thereof from outlet passage 78a to outlet passage 80a thereby removing the existing pressure signal at control passage 110a of amplifier 70a. As a result, the power jet of amplifier 70a is free to deflect from outlet passage 96a to outlet passage 98a under the influence of the fourth pressure pulse $P_i$ which results in amplifier 70a being "opened" thereby producing a corresponding output pressure pulse to passage 106a. The pressure pulse at outlet passage 98a is indicative of a speed error corresponding to the aforementioned request for a lower than existing speed of device 22.

As pointed out heretofore, no output pressure signal will be obtained from gate amplifier 70b when the speed error is in the abovementioned direction. To this end, the first speed sensor pressure pulse $P_i$ occurring at control fluid passage 88b of bistable amplifier 68b deflects the power jet thereof to outlet passage 78b which, in turn, results in a pressure signal to control passage 110b of gate amplifier 70b which is "closed" by virtue of its power jet being directed into outlet passage 80b. The second pressure pulse $P_i$ occurring at control passage 88b encounters the power jet which remains deflected into outlet passage 78b. The reference pressure pulse $P_R$ generated subsequent to the pressure pulse $P_i$ occurs at control passage 108b of amplifier 70b and is overridden by the opposing pressure signal existing at control passage 110b such that the power jet remains directed into outlet passage 96b. A delayed reference pressure pulse $P_R$ also occurs at bistable amplifier 68b via control passage 86b which contains a delay volume $V_2$ similar in function to delay volume $V_1$ of amplifier 68a. The delayed pressure pulse $P_R$ acts to deflect the power jet of amplifier 68b from outlet passage 78b to outlet passage 80b. However, a subsequent pressure pulse $P_i$ which occurs prior to the next reference pressure pulse $P_R$ deflects the power jet of amplifier 68b back to outlet passage 78b thereby pressurizing control passage 110b of amplifier 70b in anticipation of the next reference pressure pulse $P_R$ to occur at control passage 108b which pressure pulse $P_R$ is overridden by the pressure pulse $P_i$ thereby maintaining the amplifier 70b in the "closed" condition. It will be understood that the abovementioned sequence reoccurs as the pressure pulses $P_i$ and $P_R$ reoccur in timed relationship such that the gate amplifier 70b remains "closed" as long as the overspeed condition of device 22 exists.

It will be noted that each reference pressure pulse $P_R$ results in the loss of one speed sensor pressure pulse $P_i$ as indicated in FIGURE 12 such that the output pressure signal occurring at passage 98a of gate amplifier 70a has a pulse rate $f_o = f_i - f_R$ where $f_i$ and $f_R$ are the frequencies of the pressure signals $P_i$ and $P_R$, respectively, when $f_i$ is greater than $f_R$. When $f_R$ is greater than $f_i$ which indicates an underspeed condition of device 22 the reference pulses $P_i$ will maintain gate amplifier 70a "closed" in the abovementioned manner of gate amplifier 70b. Of course, with an underspeed condition, the above-mentioned sequence of operation of gate amplifiers 70a and 70b will be reversed producing an output pressure signal at passage 98b of amplifier 70b and no pressure signal at passage 98a of amplifier 70a to thereby indicate the overspeed condition.

One important consideration not to be overlooked is that the pulse duration times of pressure pulses $P_i$ and $P_R$ should be kept small compared to the total pulse period $T$ where $T = 1/f$ to allow time for the delayed action of pressure pulses $P_i$ and $P_R$ and for random occurrence of the reference pressure pulse $P_R$ in the interval between speed sensor pressure pulses $P_i$.

When the frequencies of pressure pulses $P_i$ and $P_R$ are equal thereby indicating no speed error between the requested speed $N_R$ and speed $N_1$ of device 22, both gate amplifiers 70a and 70b will be maintained in a "closed" condition as will be readily apparent from consideration of the pressure pulses $P_i$ and $P_R$ occurring at the gate amplifiers 70a and 70b and bistable amplifiers 68a and 68b.

Having described the pulse comparing function of the bistable amplifiers 68a and 68b and gate amplifiers 70a and 70b, the output pressure signal generated at passage 98a of gate amplifier 70a now will be traced through the remaining network. As pointed out heretofore, a train of output pressure pulses indicative of an overspeed condition of device 22 occurs at passage 98a. The output pressure pulses $P_a$ are transmitted via passage 106a from passage 98a to inlet 100d of bistable amplifier 68d and to control passage 86c of bistable amplifier 68c via a branch passage 232 leading from passage 106a. The gate amplifier 70b which as mentioned heretofore does not produce an output signal under an overspeed condition is connected via its passage 106b to inlet 100d of amplifier 68d and a branch passage 234 connects passage 106b to control passage 88c of bistable amplifier 68c. The pressure pulses $P_a$ occurring at control passage 86c of amplifier 68c are not opposed by a pressure signal from control passage 88c and a pulse therefor acts to deflect the power jet into outlet passage 80c thereby providing a pressure signal $P_c$ at passage 80c which communicates via its passage 106c with control passage 110d of gate amplifier 70d. The effect of pressure pulses $P_a$ on the power jet is reinforced by the pressure transmitted via a feedback passage 236 leading from passage 90c to a second control passage 86c. The outlet passage 78c of bistable amplifier 68c is connected via passage 92c to control passage 110c of gate amplifier 70c. A feedback connection 238 similar to passage 236 connects passage 92c with a second supply passage 88c of bistable amplifier 68c.

Assuming the power jet of bistable amplifier 68d to be directed into outlet passage 80d thereof, the first of the pressure pulses $P_a$ occurring at inlet 100d will cause the power jet to deflect into outlet passage 78d from which the resulting pressure signal is transmitted via passage 92d and a branch passage 240 to control passage 108c of gate amplifier 70c where it acts against the power jet of amplifier 70c causing the same to deflect into outlet passage 98c from which the resulting pressure signal is transmitted via passage 106c to inlet 100e of bistable amplifier 68e. Assuming the power jet of amplifier 68e to be initially directed into outlet passage 80e, the pressure signal at inlet 100e will cause the power jet to deflect to outlet passage 78e from which the resulting pressure signal is transmitted via passage 92e and a passage 242 to one of two control passages 110e of gate amplifier 70e. It will be noted that gate amplifier 70e is modified from the gate amplifier of FIGURE 9 to accommodate two control fluid passages 110e communicating with one side of the power jet and the opposing control fluid passage 108e is provided with a restriction 243 and connected to the source of pressure $P_s$. Thus, a continuous flow is discharged against the power jet of amplifier 70e by control passage 108e which continuous flow deflects the power jet into outlet passage 98e. A control pressure signal from one or the other of the two control passages 110e is overridden by the opposing pressure signal derived from control passage 108e. However, a pressure signal occurring at both control passages 110e is sufficient to override the opposing pressure signal at control passage 108e thereby permitting the power jet to deflect to outlet passage 96e. Thus the pressure signal occurring at the one control passage 110e is insufficient by itself to overcome the opposing pressure signal derived from control passage 108e. However, the pressure signal generated at bistable amplifier 68d is transmitted via passage 92d and branch passage 244 to the second control passage 110e. The two pressure signals overcome the opposing pressure signal and the power jet is deflected to outlet passage 96e from which the resulting pressure signal is transmitted via passage 104e from outlet passage 96e to one of two control passages 108f in gate amplifier 70f where the pressure signal deflects the power jet to outlet passage 98f thereby removing the pressure signal at outlet passage 96f which is connected via passage 104f to bellows 162 and a branch passage 246 to bellows 134. The pressure signal in passage 104e is transmitted via a branch passage 248 to inlet 100f of bistable amplifier 68f, the power jet of which is deflected from outlet passage 80f to outlet passage 78f by the introduced pressure signal. The resulting pressure signal generated in outlet passage 78f is transmitted via passage 92f to the second of the two control fluid passages 108f of gate amplifier 70f where the pressure signal reinforces the pressure signal from the other control passage 108f. The branch passage 248 is also connected to one of two control fluid passages 108g of gate amplifier 70g from which passage the resulting pressure signal acts to deflect the power jet to outlet passage 98g thereby removing the pressure signal in outlet passage 96g which is connected via passage 144 to bellows 126 and via a branch passage 250 to bellows 170. Thus, none of the bellows 126, 170, 134 and 162 are pressurized.

The passage 92d is connected to one of two control passages 110h of gate amplifier 70h (see FIGURE 3) which is similar in operation to gate amplifier 70f in that the power jet is normally deflected to outlet passage 98h by a continuous flow of pressurized fluid discharged by restricted control passage 108h which is connected to the source of fluid under pressure $P_s$. The pressure signal transmitted to the control passage 110h is overridden by the opposing pressure $P_s$ as in the case of amplifier 70e and the power jet remains deflected into outlet passage 98h. The second control passage 110h is connected to passage 90e via a passage 252 and accordingly does not receive a pressure signal. The outlet passage 96h is connected via passage 104h to one of two control fluid passages 108i of gate amplifier 70i and via a branch passage 254 to inlet 100g of bistable amplifier 68g as well as to one of two control fluid passages 108j of gate amplifier 70j. The power jet of bistable amplifier 68g being directed to outlet passage 80g remains there in view of the absence of a pressure signal at inlet 100g. The resulting pressure signal existing in outlet passage 80g is transmitted via passage 90g to the second control fluid passage 108j of amplifier 70j where the pressure signal deflects the power jet to outlet passage 98j resulting in loss of pressure in outlet passage 96j which is connected to bellows 168 and 128 via passage 104j and a branch passage 256 respectively. The outlet passage 78g is connected to the second control fluid passage 108i which, accordingly, does not receive a pressure signal. Since no pressure signal exists at either of the control fluid passages 108i, the power jet of amplifier 70i is directed into outlet passage 96i from which the resulting pressure signal is transmitted to bellows 176 and 136 via passage 104i and a branch passage 258, respectively. Thus the bellows 176 and 136 are pressurized whereas bellows 168 and 128 are not pressurized resulting in the gear member 200 being loaded accordingly tending to tilt the same about the aforementioned axis of nutation.

No pressure signal exists at outlet passage 80d of bistable amplifier 68d which passage is connected via passage 90d to one of two control fluid passages 110k of gate amplifier 70k and via a branch passage 260 to one of two control fluid passages 110n of gate amplifier 70n. Also, no pressure signal exists in outlet passage 80e of bistable amplifier 68e which passage is connected via passage 90e to the second control fluid passages 110n and 110k of gate amplifiers 70n and 70k, respectively. As a result, the power jets of gate amplifiers 70n and 70k are deflected to the respective outlet passages 98n and 98k by the continuous pressure signal derived from control fluid passages 108n and 108k, respectively, connected to the source of fluid at pressure $P_s$.

The outlet passage 96k is connected via passage 104k to one of two control fluid passages 108l of gate amplifier 70l and via a branch passage 262 to one of two control fluid passages 108m of amplifier 70m as well as to inlet 100h of bistable amplifier 68h. The outlet passage 80h continues to receive the power jet of amplifier 68h in the absence of a pressure signal at inlet 100h and the resulting pressure signal is transmitted via passage 90h to the second control fluid passage 108m of gate amplifier 70m where the pressure signal acts to deflect the power jet to outlet passage 98m thereby removing the pressure signal at outlet passage 96m. The outlet passage 96m is connected via passage 104m to bellows 174 and via a branch passage 264 to bellows 138 which results in lack of pressurization of bellows 174 and 138. The outlet passage 78h of amplifier 68h is connected via passage 92h to the second control fluid passage 108l of gate amplifier 70l where the lack of pressure signals at both control passages 108l results in the power jet passing to outlet passage 96l, the resulting pressure signal therein being transmitted via passage 104l to bellows 130 and via a branch passage 266 to bellows 166. Thus, the bellows 166 and 130 load the gear member in the same sense as belows 168 and 128.

As pointed out above, the power jet of gate amplifier 70n is deflected into outlet passage 98n by the continuous pressure signal from the control fluid passage 108n. The outlet passage 96n is connected via passage 104n to one of two control fluid passages 108p of gate amplifier 70p and via a branch passage 268 to one of two control fluid passages 108r of gate amplifier 70r as well as to inlet 100i of bistable amplifier 68i. The outlet passage 80i continues to receive the power jet of amplifier 68i in the absence of a pressure signal at inlet 100i and the resulting pressure signal in outlet passage 80i is transmitted via passage 90i to the second control fluid passage 108r where the pressure signal acts to deflect the power jet to outlet passage 98r thereby removing the pressure signal at outlet passage 96r. The outlet passage 96r is connected via passage 104r to bellows 172 and via a branch passage 270 to bellows 140 which accordingly are not pressurized. The outlet passage 78i of bistable amplifier 68i is connected via passage 92i to the second control fluid passage 108p of gate amplifier 70p. The lack of pressure signals at both control fluid passages 108p results in the power jet passing to outlet passage 96p from which the resulting pressure signal is transmitted via passage 104p to bellows 164 and via a branch passage 272 to bellows 132. Thus, as in the case of bellows 176, 136 and 174, 138, the bellows 172 and 140 are pressurized and load the gear member in a common sense causing the same to tilt about the aforementioned axis of nutation.

The second pressure pulse occurring at inlet 100d of bistable amplifier 68d causes the power jet therein to deflect from outlet passage 78d to outlet passage 80d whereupon the resulting pressure signal is transmitted to control fluid passage 109d of amplifier 70d and to gate amplifiers 70k and 70n. The second pressure pulse which also occurs at control fluid passage 86c of bistable amplifier 68c has no effect on the power jet therein which remains deflected to outlet passage 80c by virtue of the aforementioned pressure signal supplied by feedback passage 236 to passage 86c. At gate amplifier 70d, the opposing pressure signals are mutually overriding such that the power jet remains directed to outlet passage 96d. At gate amplifier 70c, no pressure signals exist at either of the control fluid passages 108c or 110c which results in deflection of the power jet from outlet passage 98c to outlet passage 96c which, in turn, results in removal of the pressure signal at inlet 100e of bistable amplifier 68e. The power jet of bistable amplifier 68e remains directed to outlet passage 78e in the absence of an increasing pressure pulse at inlet 100e.

As a result of the above, the one control fluid passage 110e of gate amplifier 70e connected to passage 92d does not receive a pressure signal whereas the other control fluid passage 110e continues to receive a pressure signal from passage 92e which, under the influence of the opposing overriding pressure $P_s$, results in the power jet being deflected from outlet passage 96e to outlet passage 98e. Consequently, no pressure signal is transmitted via passage 104e to gate amplifiers 70f and 70g or bistable amplifier 68f, the power jet of the latter amplifier remaining deflected to outlet passage 78f which, in turn, maintains the pressure signal at gate amplifier 70f causing the power jet thereof to remain deflected to outlet passage 98f. The bellows 162 and 134 which communicate with outlet passage 96f of amplifier 70f remain unpressurized. Since outlet passage 96f of amplifier 70f is not pressurized, no pressure signal is transmitted therefrom to gate amplifier 70g. In the absence of pressure signals at both control fluid passages 108g of amplifier 70g, the power jet therein passes to outlet passage 96g and the resulting pressure signal is applied to bellows 170 and 126 via passage 144. Thus, the bellows 170 and 126 which previously were not pressurized to thereby form the axis of nutation of gear member 200 are now pressurized in the abovementioned manner to load gear member 200 with the axis of nutation being defined by the adjacent unpressurized bellows 176, 136 and 168, 128 as follows:

The pressure signals at outlet passage 78e of amplifier 68e and outlet passage 78d of amplifier 68d are transmitted via passages 92e and 92d, respectively, to gate amplifier 70n where the two pressure signals override the opposing pressure signal causing the power jet to deflect to outlet passage 96n, the resulting pressure signal being transmitted to gate amplifiers 70p and 70r as well as inlet 100i of amplifier 68i. The pressure signal at inlet 100i causes the power jet of amplifier 68i to deflect to outlet passage 78i with the resulting pressure signal passing to gate amplifier 70p. Thus, both control passages 108p of gate amplifier 70p supply a pressure signal and the power jet thereof is deflected to outlet passage 98p. The bellows 164 and 132 which communicate with outlet passage 96p are not pressurized, accordingly. The gate amplifier 70r does not receive a pressure signal from outlet passage 90i of amplifier 68i but does receive the aforementioned pressure signal from outlet passage 96n of amplifier 70n which pressure signal causes the power jet to deflect to outlet passage 98r. Thus, the bellows 172 and 140 which communicate with outlet passage 96r of amplifier 70r are not pressurized. Accordingly, the plane of nutation of gear member 200 is defined by the non-pressurized bellows 164, 132 and 172, 140 as in the case of the bellows 162, 134 and 126, 170 heretofore mentioned. With each subsequent pressure pulse indication of an overspeed condition, the plane of nutation of gear member 200 is defined by the next succeeding pairs of bellows in a counterclockwise direction as viewed in FIGURE 4 in the manner described above with reference to bellows 162, 134, 126, 170 and 164, 132, 172, 140. The remaining bellows will be pressurized or non-pressurized in the abovementioned manner to load the gear member 200 such that a stepping action thereof occurs which through the coaction between gear members 226 and 200 result in a corresponding incremental motion of the shaft 208 and valve member 30 attached thereto. The movement of the valve member 30 results in a flow decrease through conduit 26 which reduces the speed of turbine or fluid motor 20 accordingly to eliminate the overspeed condition of the same.

When the device 22 driven by turbine or motor 20 reaches an on-speed condition corresponding to the speed requested by lever 54, it will be understood that the pressure pulses $P_i$ and $P_R$ occur at the same frequency. Referring to bistable amplifiers 78b and 78a (FIGURE 2), the pressure pulses $P_i$ and $R_R$ transmitted to control passage 88b and 88a, respectively, are out of phase with their respective opposing delayed pressure pulses $P_R$ and $P_i$ such that each pressure pulse at control passages 88a and 88b deflects the associated power jet to outlet passage 78a and 78b, respectively, from which the resulting pressure signals are transmitted to control passages 110a and 110b of gate amplifiers 70a and 70b, respectively. The pressure pulses occurring at control passages 110a and 110b are opposed by pressure pulse $P_i$ and $P_R$, respectively, occurring at control passages 108a and 108b, which opposing pressure pulses are mutually overriding since they occur at the same frequency. As a result, the power jets of gate amplifiers 70a and 70b are not deflected and by-pass the respective outlet passages 98a and 98b which results in no output pressure signals from the latter passages.

The operation of bistable amplifiers 68e and 68d which control the switching sequence of the various amplifiers connected to receive the pressure signals therefrom remains fixed subsequent to the last pressure pulse received thereby which, in turn, results in fixation of the gear member 200 at a position corresponding to the last pressure signals applied to the various bellows.

As pointed out heretofore, an underspeed condition of device 22 wherein the frequency of the reference pressure pulses $P_R$ exceeds the frequency of the speed sensor pressure pulses $P_i$ results in the gate amplifier 70b providing the output pressure signal rather than gate amplifier 70a. The switching sequence of the various gate amplifiers and bistable amplifiers which operate in response to the output pressure signal from 70b is similar to that mentioned heretofore in regard to an overspeed condition except for a general reversal of the switching function of the amplifiers as is apparent from inspection of the amplifier network. In response to such reversal of the switching function of the amplifiers, the sequence of pressurization of the various bellows is reversed from that described heretofore in regard to an overspeed condition such that the gear member 200 nutates in a corresponding opposite direction thereby rotating shaft 208 and valve 30 so as to increase the flow through conduit 26 to turbine or fluid motor 20.

Referring to FIGURE 2, there is indicated generally by the numeral 274 an alternate means of providing a reference input pressure signal in the event the tuning fork 56 arrangement is not desired. The alternate reference input pressure means 274 includes a gate amplifier 70s connected to the source of fluid 28. The outlet passage 98s is connected via passage 276 shown in dashed line to supply pressure pulses at a predetermined frequency to passage 64 as in the case of nozzle 28. The outlet passage 96s is connected via a passage 278 to control fluid passage 110s and via a branch passage 280 and a predetermined volume 282 to control fluid passage 108s. The predetermined volume 282 is vented to drain pressure $P_o$ via a restriction 284.

The power jet of amplifier 70s passes into output pressure passage 96s from which the resultant pressurized fluid flows through passage 278 to control fluid passage 110s which is provided with a restriction 286. The restriction 286 serves to throttle flow through passage 110s thereby reducing the pressure of the fluid discharged from passage 110s against the power jet. The pressurized fluid in introduced via branch passage 280 to volume 282 where the pressure builds up at a rate depending upon the effective volume of volume 282 and the rate at which fluid flow is vented from volume 282 via restriction 284 to drain pressure $P_o$. Assuming a fixed volume 282 and area of restriction 284, a corresponding time interval will occur before the fluid pressure in volume 282 reaches a maximum at which time the pressurized fluid discharged from control passage 108s overrides the opposing fluid at reduced pressure discharged from control passage 110s causing the power jet to deflect to passage 98s. With the power jet deflected to passage 98s, the fluid pressure in passage 96s drops accordingly whereupon the fluid pressure in volume 282 decreases accordingly allowing the power jet to deflect back to outlet passage 96s whereupon the aforementioned cycle is repeated. The resulting pressure pulses generated in outlet passage 98s occur at a predetermined frequency and are supplied to passage 64 via passage 276.

While the amplifier 78s is shown and described as generating reference pressure pulses of fixed frequency, it will be understood that the frequency of the pressure pulses may be made variable by making the volume 282 and/or the area of restriction 284 variable. To this end, the throttle 54 may be suitably connected by means, not shown, to vary the volume 282 or the area of restriction 284 as a function of throttle lever position as will be readily understood by those persons skilled in the art.

Various changes and modifications of the structure disclosed in the drawings and described heretofore may be made by those persons skilled in the art without departing from the scope of applicant's invention.

I claim:

1. Control apparatus for controlling a positionable member as a function of an input signal comprising:
   nutating stepping means operatively connected to the positionable member for actuating the same;
   a plurality of fluid pressure responsive means operatively connected in spaced apart relationship to said nutating means for actuating the same; and
   pure fluid amplifier means responsive to the input signal and connected to said plurality of fluid pressure responsive means for controlling the pressurization thereof in sequence in response to the input signal.

2. Control apparatus as claimed in claim 1 wherein said plurality of fluid pressure responsive means is defined by first and second spaced apart groups of spaced apart bellows having opposing movable end portions interconnected and fixedly secured to said nutatable stepping means.

3. Control apparatus as claimed in claim 1 wherein said pure fluid amplifier means includes:
   bistable pure fluid amplifier means responsive to a first pulsating pressurized control fluid flow ($P_R$) having a predetermined reference frequency and a second pulsating pressurized control fluid flow ($P_i$) having a frequency which varies in accordance with said input signal and adaptable to produce a pulsating output pressurized fluid flow in response to the frequency error between said first and second pulsating fluid flows;
   gate pure fluid amplifier means responsive to said pulsating output pressurized flow and said second pulsating control fluid flow and adapted to produce a pulsating output pressurized fluid flow in response to the frequency error between said pulsating output flow and said second pulsating control flow; and
   a plurality of additional pure fluid amplifier means operatively connected to said gate amplifier means and responsive to the pulsating output fluid flow therefrom for pressurizing a predetermined number of said plurality of fluid pressure responsive means in sequential order to cause nutating movement of said stepping means.

4. Control apparatus for controlling a positionable member as a function of an input signal comprising:
   nutatable stepping means operatively connected to the positionable member for actuating the same;
   a plurality of pairs of fluid pressure responsive means arranged in spaced apart relationship with the pressure responsive means of each pair acting in opposition to one another;
   said plurality of pairs of fluid pressure responsive means being operatively connected to said nutatable stepping means for actuating the same;
   a plurality of first pure fluid amplifier means each having an output pressure passage and a vent passage and a fluid jet deflectable to one or the other of said passages;
   said output pressure passage being connected to supply pressurized fluid derived from said fluid jet to an associated one of the fluid pressure responsive means in each of two pairs thereof;
   a plurality of control fluid passages associated with each of said plurality of first pure fluid amplifier means for controlling deflection of said fluid jet; and
   a plurality of second pure fluid amplifier means including amplifier means responsive to the input signal operatively connected to said plurality of control fluid passages for pressurizing the same to control deflection of said fluid jet and thus the pressurization of said fluid pressure responsive means in a predetermined sequence.

5. Control apparatus as claimed in claim 4 wherein the input signal to said amplifier means is in the form of a reference pulsating fluid pressure and a pulsating fluid pressure representative of a condition to be controlled with said amplifier means producing a pulsating output pressure indicative of the error between said reference pressure and said fluid pressure representing the condition to be controlled.

6. Control apparatus as claimed in claim 4 wherein each pair of said plurality of pairs of fluid pressure responsive means includes:
   first and second bellows aligned axially in spaced apart relationship and anchored at respective first ends to an associated fixed support; and
   an actuating link fixedly secured to spaced apart second movable ends of said first and second bellows and movable in response to pressurization of either of said first and second bellows to actuate said nutatable stepping means;
   said plurality of first bellows being arranged in a circular pattern in spaced apart relationship;
   said plurality of second bellows being arranged in a circular pattern in spaced apart relationship.

7. Control apparatus for controlling a positionable member as a function of an input signal comprising;
   a nutating stepping motor operatively connected to the positionable member for actuating the same and including a plurality of fluid pressure responsive members adapted to be pressurized in a predetermined sequential order to provide the nutating stepping action associated with said motor;
   control means including first fluid amplifier means, second fluid amplifier means and third fluid amplifier means connected to control the pressurization of said plurality of fluid pressure responsive means in a predetermined sequential order in response to the input signal;
   said first, second, and third fluid amplifier means each having first and second output pressure passages, a fluid jet deflectable to one or the other of said first and second output pressure passages and a plurality of control fluid passages for controlling the deflection of said fluid jet;
   said third fluid amplifier means being connected to supply an output pressure signal to said fluid pressure responsive means in a predetermined sequential order;
   said first fluid amplifier means having the control fluid passages associated therewith connected to receive fluid pressures representing the input signal and having said first output pressure passages associated therewith connected to said control fluid passages of said second fluid amplifier means for controlling the position of the fluid jet thereof and thus the order of pressurization of the associated first and second output pressure passages which, in turn, are connected to said control fluid passages of said third fluid amplifier means to control the position of the fluid jet thereof and thus the pressurization sequence of said fluid pressure responsive means.

8. Control apparatus for controlling a positionable member as a function of an input signal comprising:
first pure fluid amplifier means responsive to the input signal and adapted to provide a first output fluid pressure signal which varies as a function of the input signal;
second pure fluid amplifier means responsive to said first output fluid pressure and adapted to provide a second output fluid pressure signal;
third pure fluid amplifier means responsive to said second output fluid pressure and adapted to provide a third output fluid pressure signal; and
nutating stepping motor means including a plurality of spaced apart fluid pressure responsive members responsive to said third output fluid pressure operatively connected to said positionable member for actuating the same.

9. Control apparatus as claimed in claim 8 wherein said nutating stepping motor means further includes:
a casing having spaced apart end walls;
said plurality of fluid pressure members being defined by a first group of spaced apart fluid pressure responsive members secured to one of said end walls and a second group of spaced apart fluid pressure responsive members secured to the other of said end walls and opposing said first group;
a nutatable gear member provided with first and second series of gear teeth and secured to said first and second groups of fluid pressure responsive members for actuation thereby;
a first gear member fixedly secured to one of said end walls and provided with a series of teeth equal in number to and adapted to mesh with said first series of gear teeth;
an output member extending outwardly from said casing into engagement with said positionable member for actuating the same;
a second gear member fixedly secured to said output member and provided with a series of teeth different in number to and adapted to mesh with said second series of gear teeth.

10. Control apparatus for controlling a positionable member as a function of an input signal comprising:
first and second bistable pure fluid amplifiers each of which is provided with a main fluid jet and first and second control fluid passages for injecting pressurized fluid transversely against said main jet to thereby direct the same to first and second output passages, respectively;
first fluid flow signal generating means connected to the first control passage of said first bistable fluid amplifier and the second control passage of said second bistable fluid amplifier and operative to supply thereto a pulsating fluid flow having a predetermined reference frequency;
second fluid flow signal generating means connected to the second control passage of said first bistable fluid amplifier and the first control passage of said second bistable fluid amplifier and operative to supply thereto a pulsating fluid flow having a frequency which varies in accordance with the input signal;
first and second gate pure fluid amplifiers each of which is provided with a main fluid jet and opposing first and second control fluid passages for injecting pressurized fluid transversely against the main fluid jet associated therewith to thereby direct the same into one of first and second output passages thereof depending upon the frequency error of said pulsating fluid flows injected by said first and second control fluid passages;
a first output fluid pressure signal derived from said first output passages of said first and second gate pure fluid amplifiers;
second pure fluid amplifier means responsive to said output fluid pressure signal and adapted to provide a second output fluid pressure signal;
third pure fluid amplifier means responsive to said second output fluid pressure signal and adapted to provide a third output fluid pressure signal; and
fluid pressure responsive means responsive to said third output fluid pressure signal and connected to the positionable member for actuating the positionable member in response to said third output fluid pressure signal.

References Cited

UNITED STATES PATENTS

| | | | |
|---|---|---|---|
| 2,879,467 | 3/1959 | Stern | 235—201 |
| 3,228,602 | 1/1966 | Boothe | 137—81.5 |
| 3,223,522 | 2/1966 | Stern | 137—81.5 |
| 3,260,271 | 7/1966 | Katz | 137—81.5 |
| 3,292,648 | 12/1966 | Colston | 137—81.5 X |
| 3,301,269 | 1/1967 | Marwood | 137—26 |
| 3,302,398 | 2/1967 | Taplin et al. | 137—81.5 X |

OTHER REFERENCES

Gray, W. E. and Stern, Hans, Fluid Amplifiers, Capabilities and Applications. In Control Engineering February 1964. Page 64.

M. CARY NELSON, Primary Examiner

WILLIAM R. CLINE, Assistant Examiner

U.S. Cl. X.R.

137—36